United States Patent [19]

Sogandares

[11] Patent Number: 4,564,989

[45] Date of Patent: Jan. 21, 1986

[54] DEVICE FOR INSERTING AND REMOVING TUBES FROM STOPPERS

[75] Inventor: Franklin Sogandares, Dallas, Tex.

[73] Assignee: Southern Methodist University, Dallas, Tex.

[21] Appl. No.: 179,749

[22] Filed: Aug. 20, 1980

[51] Int. Cl.[4] ........................................ B23P 19/02

[52] U.S. Cl. ................................................ 29/235

[58] Field of Search ..................... 29/235, 235.5, 236, 29/283, 281.1; 269/43, 287, 900; 220/255; 206/45, 34, 216

[56] References Cited

U.S. PATENT DOCUMENTS

| | | | |
|---|---|---|---|
| D. 161,840 | 2/1951 | Hopp | 211/71 |
| 2,522,495 | 9/1950 | Ballagh | 29/236 |
| 2,589,423 | 3/1952 | Nadolsky et al. | 206/216 |
| 3,098,721 | 7/1963 | Jewell | 220/255 |
| 3,476,257 | 11/1969 | O'Connell | 211/69.5 |
| 3,502,204 | 3/1970 | James | 206/45.34 |

OTHER PUBLICATIONS

Charles E. Dull, *Modern Chemistry*, p. 69, Henry Holt and Company, New York, Copyright 1936, 1940, 1942, 1947.

*Primary Examiner*—Robert C. Watson
*Attorney, Agent, or Firm*—Gary C. Honeycutt

[57] ABSTRACT

A device for use when inserting a tube into or through a rubber stopper, or other resilient sealing member. A rigid body member is provided with one or more holes shaped to support a tube in an upright position, so that a person can manually grip and push a stopper downward over the tube, without the normal difficulty of having to grip both the tube and the stopper at the same time. In a preferred embodiment the body member is also provided with a base to support the body in a stable position on a work bench or the like, and is further provided with a rigid protrusion having a suitable diameter for use in removing the tube from the stopper.

3 Claims, 1 Drawing Figure

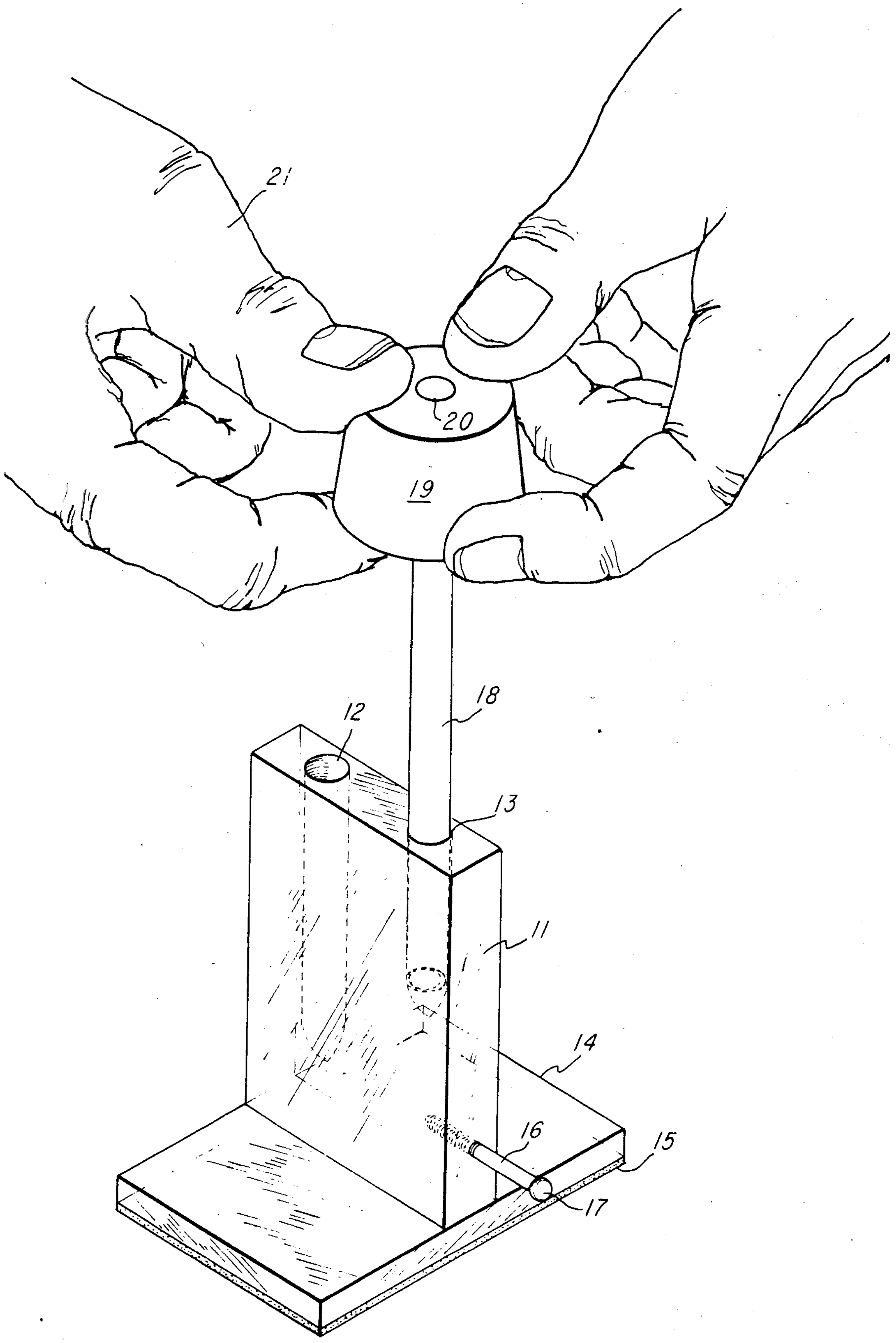
21
20
19
18
12
13
11
14
16
15
17

DEVICE FOR INSERTING AND REMOVING TUBES FROM STOPPERS

This invention relates to apparatus for use in assisting with the insertion of a tube through an opening in a rubber stopper, or other resilient sealing member; and also to apparatus for assisting with its removal.

Laboratory animals are usually kept in cages equipped with water bottles having rubber stoppers through which are inserted metal tubes from which the animals drink the water. Periodically, the tubes must be removed, cleaned, and reinserted. Conceptually, this is a simple task; however, the technician's hand is usually too wet to enable a firm grip on the tube, so the usual practice requires that the end of the tube be forced into the palm of the hand in order to push the tube through the stopper. Since there are frequently many tubes to be removed and reinserted, a technician's hand can readily become blistered and sore.

Accordingly, it is an object of the invention to provide an apparatus for assisting the technician with the task of inserting and/or removing a tube from an opening in a stopper.

One aspect of the invention is embodied in such a device having a body member that includes one or more holes having a diameter somewhat larger than the diameter of the tube to be inserted, and having a depth substantially less than the length of the tube, so that the tube can be supported in the hole and extend therefrom a distance equal to or greater than the desired insertion distance into the stopper. It is preferred that the device have a skid-resistant base to permit the device to stand alone on a work bench or the like.

The preferred embodiment also includes several holes of different depths, so as to accommodate tubes of different lengths. That is, the technician will select a particular hole having the proper depth necessary to ensure that the tube will extend from the hole just enough to provide the optimum insertion distance into or through the stopper.

Thus, the body member is preferably translucent or transparent, so that the technician can readily see which hole has the proper depth.

An additional feature of the preferred embodiment is the addition of a rigid post-like member extending from the body or base of the device, having a diameter substantially equal to or slightly less than the diameter of the inserted tube, and having a length suitable for use in removing an inserted tube from a stopper. That is, the length is preferably equal to the thickness of the stopper; or equal to the thickness of the thickest stopper, if more than one stopper size is commonly used in a given laboratory.

In the drawing, one embodiment of the invention is seen to include body member 11 attached to base member 14 and having a plurality of holes 12 and 13 therein, extending different depths into the body, for the purpose of accommodating tubes of different lengths.

Base 14 has a skid-resistant surface 15, for convenience when the device is placed on a work bench or other support. Post 16 is for use in removing an inserted tube, and preferably includes a rounded, enlarged tip 17 having a diameter suitable for that purpose.

The device is used by placing a tube 18 into a hole 13, for example, and then placing stopper 19 over the tube so that hole 20 is aligned with the end of the tube. A technician then grips the stopper in a manner illustrated by hands 21, to force the stopper downward and thereby complete the operation.

To remove the tube, the device is placed on its side, with post 16 pointed upward. The technician then places a stopper over the post end 17, so that an inserted tube contacts end 17; and then forces end 17 through the stopper so that the tube is forced out.

The illustrated embodiment is made of plexiglass for convenience, so that its transparent nature permits one to readily see the depth of each hole in the body. Other materials of construction are also useful.

The tube most commonly used is made of stainless steel, and is equipped with a stainless ball retained in the end of the tube to control water flow. Other tubes may also be inserted and removed with the device of the invention.

Studies have shown that an experienced technician can insert tubes into stoppers at the rate of about 300 tubes per hour, with the use of this invention. Without the invention, only about 35 tubes per hour can be inserted.

I claim:

1. A device for inserting a tube into an opening through a resilient stopper, comprising:

(1) a body member having a hole therein shaped to accommodate insertion of said tube; said hole having a diameter somewhat larger than the tube diameter, and a depth substantially less than the length of said tube; whereby the tube, when inserted therein, extends therefrom a distance equal to or greater than the desired insertion distance into or through said stopper;

(2) means for stabilizing said body member on a supporting surface, so that it cannot readily tip over or slide during use; and (3) means for assisting in the removal of said tube from said stopper, comprising a rigid member in combination with said body and base, extending outwardly therefrom, and having a diameter substantially equal to that of said tube.

2. A device as in claim 1 wherein said rigid member extends outwardly in a direction substantially perpendicular to said hole and parallel to said base member, whereby the device can be turned on its side and thereby point said rigid member upward for convenience in removing said tube.

3. A device as in claim 1 or 2 wherein said body member includes a plurality of holes of different depths, so that a particular hole may readily be selected to accommodate a tube of a given length, and thereby permit only the desired amount of extension therefrom.

* * * * *